(12) United States Patent
Brandt et al.

(10) Patent No.: US 8,812,216 B2
(45) Date of Patent: Aug. 19, 2014

(54) METHOD AND APPARATUS FOR OPERATING AN INTERNAL COMBUSTION ENGINE

(75) Inventors: Martin Brandt, Wörth a.d. Donau (DE); Joachim Engelmann, Cham (DE); Jürgen Fritsch, Regensburg (DE); Manfred Gaul, München (DE); Hui Li, Regensburg (DE); Gonzalo Medina-Sanchez, Köln (DE)

(73) Assignee: Continental Automotive GmbH, Hannover (DE)

(*) Notice: Subject to any disclaimer, the term of this patent is extended or adjusted under 35 U.S.C. 154(b) by 343 days.

(21) Appl. No.: 13/379,210

(22) PCT Filed: Jun. 14, 2010

(86) PCT No.: PCT/EP2010/058281
§ 371 (c)(1),
(2), (4) Date: Dec. 19, 2011

(87) PCT Pub. No.: WO2010/146008
PCT Pub. Date: Dec. 23, 2010

(65) Prior Publication Data
US 2012/0101709 A1    Apr. 26, 2012

(30) Foreign Application Priority Data
Jun. 18, 2009    (DE) .................. 10 2009 025 480

(51) Int. Cl.
*F02D 41/40* (2006.01)
*F02D 41/00* (2006.01)

(52) U.S. Cl.
CPC .......... *F02D 41/405* (2013.01); *F02D 41/0097* (2013.01)
USPC .......... 701/105; 701/110; 123/299; 123/300; 123/305; 123/436

(58) Field of Classification Search
CPC ... F02D 41/401; F02D 41/402; F02D 41/403; F02D 41/405; F02D 41/0097
USPC ........... 123/299, 300, 305, 436; 701/105, 110
See application file for complete search history.

(56) References Cited

U.S. PATENT DOCUMENTS

| 6,983,731 | B2 | 1/2006 | Rohatschek et al. ......... 123/299 |
| 7,234,439 | B2* | 6/2007 | Kikutani et al. ............. 123/299 |

(Continued)

FOREIGN PATENT DOCUMENTS

| DE | 10033343 | A1 | 1/2002 | ............. F02D 41/30 |
| DE | 10310955 | A1 | 11/2003 | ............. F02D 41/20 |
| DE | 102006001368 | A1 | 7/2007 | ............. F02D 41/40 |
| DE | 10 2008 043 971 | * | 5/2010 | ............. F02D 41/30 |

(Continued)

OTHER PUBLICATIONS

International PCT Search Report and Written Opinion, PCT/EP2010/058281, 18 pages. Sep. 15, 2010.

*Primary Examiner* — Hai Hunyh
(74) *Attorney, Agent, or Firm* — King & Spalding L.L.P.

(57) ABSTRACT

In a method and the corresponding apparatus for operating an internal combustion engine with a plurality of cylinders (Z1 to Z4) which are assigned in each case one injection valve (18) for metering in fuel, a control apparatus (25) is provided with in each case one output stage (25a) for actuating the injection valves (18) of the plurality of cylinders. Here, first of all work injection operations (P0 to P4) are determined for a cylinder (CYL_i) with the duration and positioning in relation to the crankshaft rotary angle. Following this, late injection operations (P5), which are required in certain operating modes, for the preceding cylinder (CYL_i–1) in the ignition sequence are arranged in a setpoint crankshaft angular range (SB) in such a way that no temporal overlaps occur between individual work and late injection operations.

12 Claims, 3 Drawing Sheets

(56) References Cited

U.S. PATENT DOCUMENTS

| | | | |
|---|---|---|---|
| 7,314,036 B2 * | 1/2008 | Altenschmidt | 123/299 |
| 7,395,807 B2 * | 7/2008 | Watanabe | 123/305 |
| 8,095,295 B2 * | 1/2012 | Engelmann et al. | 701/105 |
| 2005/0284443 A1 | 12/2005 | Huber et al. | 123/299 |
| 2010/0114459 A1 | 5/2010 | Engelmann et al. | 701/105 |

FOREIGN PATENT DOCUMENTS

| | | | | |
|---|---|---|---|---|
| DE | 10 2009 025 480 | * | 1/2011 | F02D 41/40 |
| EP | 1497544 B1 | | 4/2003 | F02D 41/20 |
| GB | 2364576 B | | 7/2002 | F02D 41/20 |
| WO | 03/085245 A1 | | 10/2003 | F02D 41/20 |
| WO | 2008/092827 A1 | | 8/2008 | F02D 41/20 |

* cited by examiner

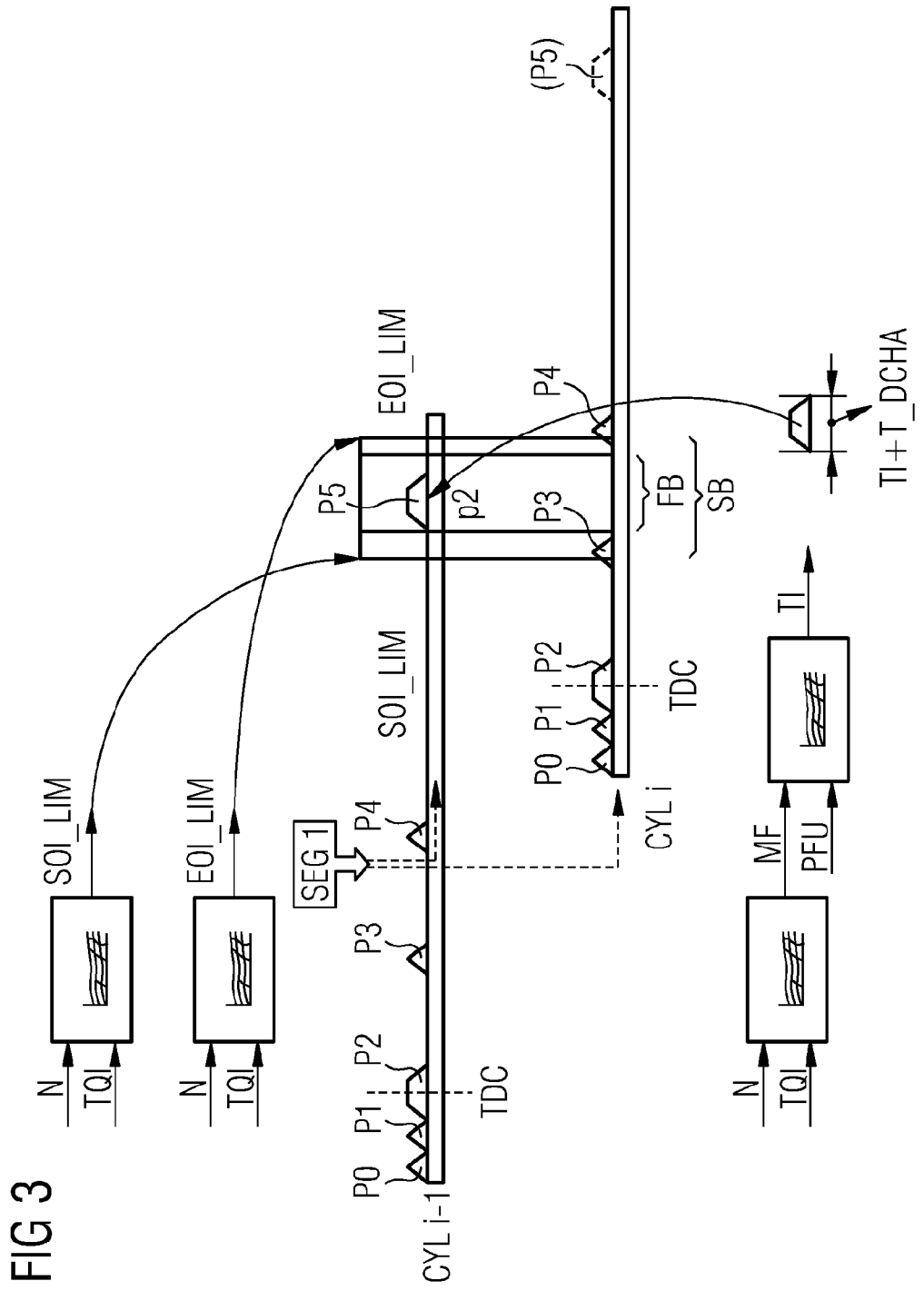

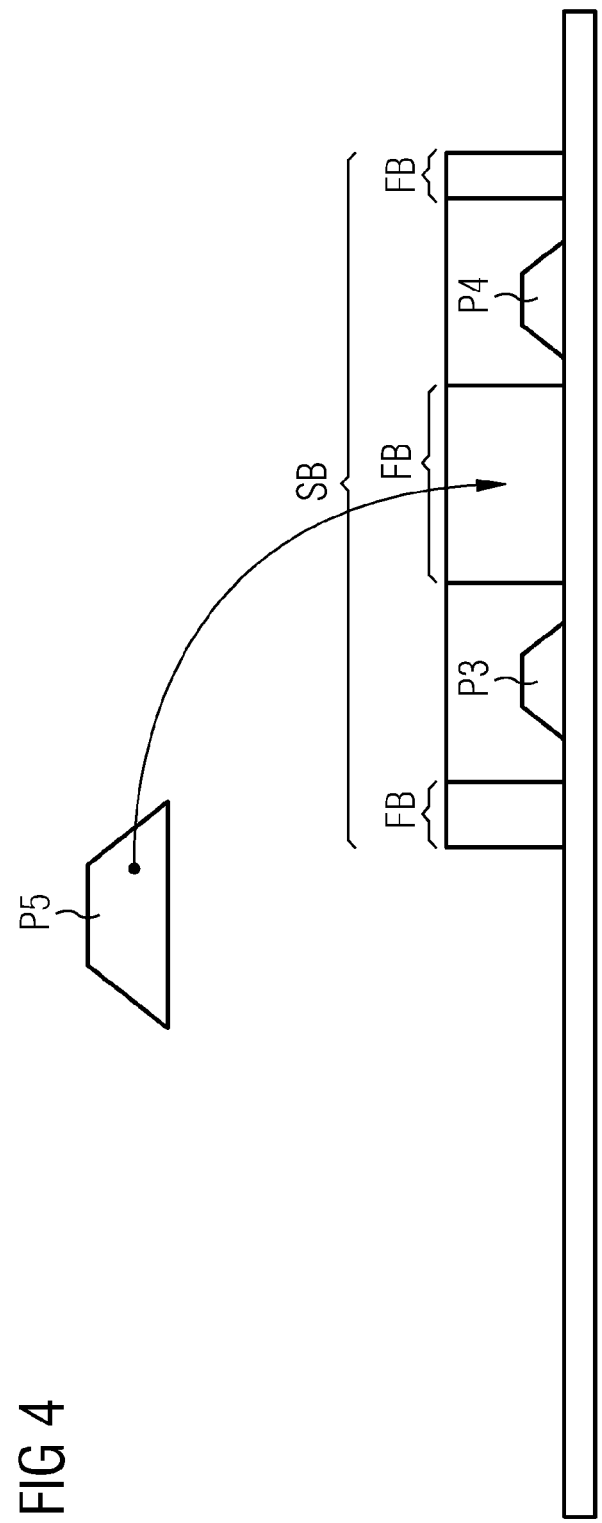

METHOD AND APPARATUS FOR OPERATING AN INTERNAL COMBUSTION ENGINE

CROSS-REFERENCE TO RELATED APPLICATIONS

This application is a U.S. National Stage Application of International Application No. PCT/EP2010/058281 filed Jun. 14, 2010, which designates the United States of America, and claims priority to German Application No. 10 2009 025 480.3 filed Jun. 18, 2009, the contents of which are hereby incorporated by reference in their entirety.

TECHNICAL FIELD

The invention relates to a method and a device for operating an internal combustion engine having a plurality of cylinders to which is assigned in each case one injection valve for metering in fuel, wherein at least one output stage is provided for actuating a plurality of injection valves.

BACKGROUND

Ever more stringent legal regulations with regard to admissible pollutant emissions of motor vehicles comprising internal combustion engines make it necessary to keep the pollutant emissions during the operation of the internal combustion engine as low as possible. This may firstly be achieved by reducing pollutant emissions generated during the combustion of the air/fuel mixture in the respective cylinder of the internal combustion engine. Secondly, in internal combustion engines, use is made of exhaust-gas aftertreatment systems which convert the pollutant emissions generated during the combustion process of the air/fuel mixture in the respective cylinders into non-harmful substances. In this connection, use is also made for example of diesel particle filters.

To control the combustion process in the cylinder, or also the conversion process in the exhaust-gas aftertreatment system, in a targeted manner, in each working cycle of a cylinder, the fuel is metered in in an injection cycle in relation to the rotational angle of the crankshaft, composed of a plurality of temporally spaced-apart partial injections which differ in quantity. Depending on the number of cylinders and the extent of the individual injection cycles over the rotational angle of the crankshaft, temporal overlapping of injection cycles of individual cylinders which follow one another in the ignition sequence may arise. This means that, in the worst case, individual partial injections for different cylinders can temporally overlap. However, if only one common output stage is available for actuating the injectors of the cylinders in question, this leads to a conflict because in each case only one injector of the output stage group defined in this way can be actuated. This problem arises in particular when, in specific operating modes, certain partial injections must be carried out very late in the working cycle of a cylinder in order to supply unburned air/fuel mixture to the exhaust-gas aftertreatment system. This is necessary for example in order, on demand or at certain time intervals during ongoing operation, to increase the temperature in the exhaust-gas aftertreatment system for the regeneration of the filters or catalytic converters.

Said late partial injections, which fall temporally, or in relation to the crankshaft angle, within the injection cycle of the subsequent cylinder of the same output stage group in the ignition sequence, will be referred to hereinafter for short as late injections.

The partial injections arranged in the crankshaft angle range or time period between the start of the respective injection cycle and before the start of the subsequent injection cycle, that is to say before the start of the earliest partial injection of the injection cycle of the subsequent cylinder of the same output stage group in the ignition sequence, will be referred to hereinafter as working injections.

DE 10033343 A1 discloses a fuel injection system for an internal combustion engine having at least two cylinders. The fuel injection system has at least two piezoelectric actuator elements, and each cylinder is assigned at least in each case one piezoelectric actuator element for the injection of fuel into the cylinders by the charging or discharging of the piezoelectric element. The fuel injection system has an injection regulating means for monitoring and/or resolving a conflict in the actuation of actuator elements for injecting fuel into the respective cylinders.

In a method known from EP 1 497 544 B1 for operating a fuel injection system, it is monitored whether, during an injection of relatively low priority, the charging or discharging of the associated piezoelectric element takes place within a predefined time interval around the time of a charging or discharging of a further piezoelectric element for an injection of relatively high priority. During the operation of the fuel injection system, the intervals between temporal charging and/or discharging flanks are determined, and from this the magnitude of a displacement and/or shortening of the injections of relatively low priority in relation to the injections of relatively high priority are determined.

SUMMARY

According to various embodiments, a method and a device for operating an internal combustion engine can be provided which permit reliable and precise operation of the internal combustion engine, in particular with regard to low pollutant emissions, without power losses.

According to an embodiment, a method for operating an internal combustion engine having a plurality of cylinders to which is assigned in each case one injection valve for metering in fuel, wherein a control device is provided having in each case one output stage for actuating the injection valves of a plurality of cylinders thereby combined to form an output stage group, and wherein the cylinders each run through working cycles temporally offset one after the other in an ignition sequence, and an injection cycle is run through in each working cycle of a respective cylinder, said injection cycle comprising working injections and, if required in an operating mode, at least one late injection, may have the following steps:—determining the working injections, with duration and positioning in relation to the crankshaft rotational angle, for a current cylinder of the output stage group in the ignition sequence,—determining a setpoint crankshaft angle range within which the late injection of a preceding cylinder in the ignition sequence should be arranged,—determining a free range within the setpoint crankshaft angle range, taking into consideration the determined working injections of the current cylinder in the ignition sequence, during which no injection takes place and the output stage is available for generating a late injection,—defining the late injection assigned to the preceding cylinder in the ignition sequence and arranging said late injection within the determined free range of the current cylinder, and—actuating the output stage to act on the respective injection valves with actuating signals for generating the working injections and the late injection.

According to a further embodiment, the predefined setpoint crankshaft angle range can be determined as a function of at least one load value of the internal combustion engine. According to a further embodiment, the load value may represent the rotational speed of the crankshaft and/or a torque. According to a further embodiment, a start angle of the setpoint crankshaft angle range may lie at least 120° after ignition top dead center TDC of a reciprocating piston of the respective cylinder. According to a further embodiment, in the case of a free range composed of a plurality of discontinuous range parts, the late injection can be preferably arranged in a range part of the free range which, owing to its temporal extent, is suitable for accommodating the late injection for its total duration. According to a further embodiment, in the case of a free range composed of a plurality of discontinuous range parts, the late injection can be split up into a plurality of partial injections and arranged so as to be distributed between different range parts of the free range. According to a further embodiment, the late injection can be arranged at a middle time in relation to the crankshaft angle within the free range or the predetermined portion of the free range. According to a further embodiment, the late injection can be arranged, as a function of further operating parameters, at an early or middle or late time in relation to the crankshaft angle within the free range or the predetermined portion of the free range.

According to another embodiment, a device for operating an internal combustion engine having a plurality of cylinders to which is assigned in each case one injection valve for metering in fuel, wherein the device has a control device having an output stage for actuating the injection valves of a plurality of cylinders thereby combined to form an output stage group, and wherein the cylinders each run through working cycles temporally offset one after the other in an ignition sequence, and an injection cycle is run through in each working cycle of a respective cylinder, said injection cycle comprising working injections and, if required in an operating mode, at least one late injection, may be designed and set up such that—the working injections are determined, with duration and positioning in relation to the crankshaft rotational angle, for a current cylinder of the output stage group in the ignition sequence,—a setpoint crankshaft angle range within which the late injection of a preceding cylinder in the ignition sequence should be arranged is determined,—a free range within the setpoint crankshaft angle range, during which free range no injection takes place and the output stage is available for generating a late injection, is determined taking into consideration the determined working injections of the current cylinder in the ignition sequence,—the late injection assigned to the preceding cylinder in the ignition sequence is defined and arranged within the determined free range of the current cylinder, and—the output stage is actuated to act on the respective injection valves with actuating signals for generating the working injections and the late injection.

BRIEF DESCRIPTION OF THE DRAWINGS

Exemplary embodiments will be explained in more detail below on the basis of the schematic drawings, in which:

FIG. 3 shows a first flow schematic, and

FIG. 4 shows a second flow schematic.

Elements of identical design or function are denoted by the same reference symbols throughout the figures.

DETAILED DESCRIPTION

Figure 1:
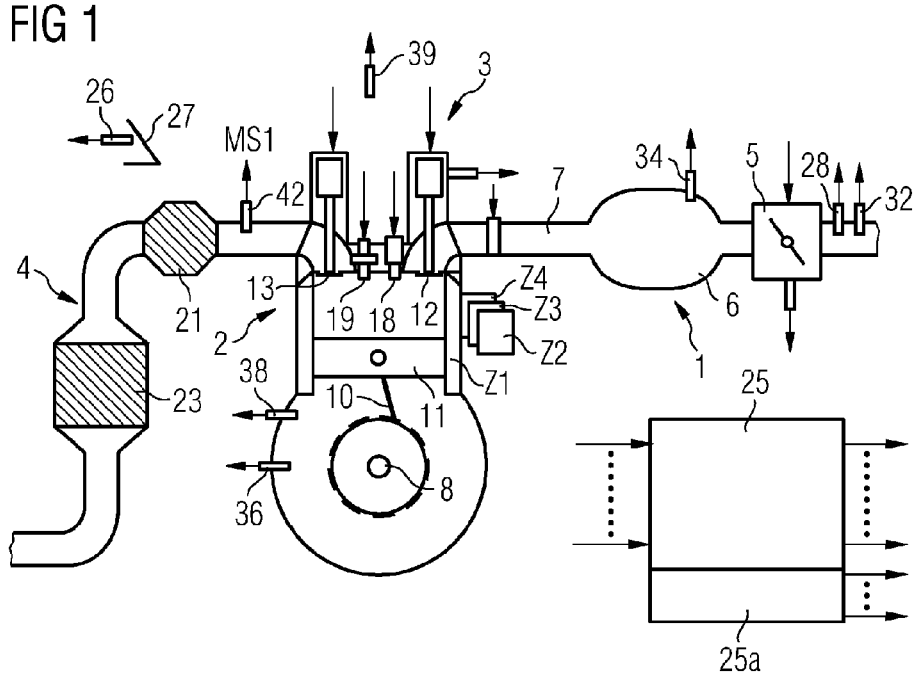
FIG. 1 shows an internal combustion engine with a control device.

According to various embodiments, in a method and a corresponding device for operating an internal combustion engine having a plurality of cylinders to which is assigned in each case one injection valve for metering in fuel, a control device is provided having in each case one output stage for actuating the injection valves of a plurality of cylinders thereby combined to form an output stage group.

During operation of the internal combustion engine, the cylinders each run through working cycles temporally offset one after the other in an ignition sequence, wherein a respective working cycle comprises two strokes of the reciprocating piston running in the respective cylinder, and therefore a total crankshaft rotational angle of 720°. An injection cycle is run through in each working cycle of a respective cylinder, said injection cycle comprising working injections and, if required in an operating mode (for example if a temperature increase in the exhaust-gas aftertreatment system is required), at least one late injection.

Here, "working injections" refers to those partial injections of an injection cycle which are arranged in the crank angle range or time period between the start of the respective injection cycle and before the start of the subsequent injection cycle, that is to say before the start of the earliest partial injection of the injection cycle of the subsequent cylinder of the same output stage group in the ignition sequence. Here, "late injections" refers to those partial injections of an injection cycle which, in the temporal sequence, must take place so late in relation to the crankshaft rotational angle that they must be arranged already in the range of the injection cycle of the subsequent cylinder of the same output stage group in the ignition sequence. Here, it is by all means possible for a plurality of working cycles and also a plurality of late injections to take place in one working cycle.

During the course of the method for operating an internal combustion engine, for a current cylinder in the ignition sequence, firstly the temporal position and duration of the working injections in relation to the crankshaft rotational angle are determined which are free from temporal overlaps with the working injections of the subsequent cylinder of the same output stage group in the ignition sequence, whose injection valve is actuated by means of the same output stage.

Subsequently, for the late injections which may be required and which are assigned to the preceding cylinder of the same output stage group in the ignition sequence, the injection valve of which is thus actuated by means of the same output stage, a setpoint crankshaft angle range is determined within which said late injections should be placed.

Subsequently, it is determined which free range of the setpoint crankshaft angle range remains free taking into consideration the position and duration of the working injections of the current cylinder in the ignition sequence. This is the range in which the output stage is not occupied by working injections of the current cylinder in the ignition sequence, and is available for generating the late injections, which may be required, of the preceding cylinder of the same output stage group in the ignition sequence. Here, the free range may be composed of a plurality of free range parts which lie in each case before, after or between working injections.

The late injections which may be required and which are assigned to the preceding cylinder in the ignition sequence are thereafter defined, and arranged within the determined free range, with regard to the parameters which determine the injection quantity.

The output stage is actuated so as to output actuating signals to the respective injection valves for generating the injection impulses both for the working injections and also for the late injections.

In this way, it is possible in a simple manner for all the injection impulses to be placed in a conflict-free manner in terms of time or with regard to the crankshaft angle, and therefore to obtain particularly effective and low-pollution operation of the internal combustion engine.

The "preceding cylinder", "current cylinder" and "subsequent cylinder" in the ignition sequence are to be understood in a temporal sense or in relation to the crankshaft angle, and relate in each case to the same output stage group. Viewing the overall arrangement of the cylinders, this may also encompass a situation in which these cylinders are not directly adjacent in the superordinate ignition sequence, if for example in the case of a six-cylinder engine the cylinders 1, 3 and 5 are assigned to one output stage and the cylinders 2, 4 and 6 are assigned to a second output stage.

Use is also made of the realization that the late injections can typically be metered in within a relatively broad setpoint crankshaft angle range without causing significant changes in the effect attributed thereto, such as for example a regeneration of a diesel particle filter.

In one embodiment, the predefined setpoint crankshaft angle range for the arrangement of the late injections is determined as a function of at least one load value, which optionally represents the rotational speed and/or a torque.

In a further embodiment, a start of the setpoint crankshaft angle range lies at least 120° after ignition top dead center of the associated reciprocating piston of the respective cylinder. This may be advantageous for example in the case of an internal combustion engine with four cylinders.

In a further embodiment, in the case of a discontinuous free range, the late injection is preferably arranged in that portion of the free range which, owing to its temporal extent, is suitable for accommodating the late injection for its total duration. In this way, the processing expenditure for the arrangement of the late injection, and therefore also the programming expenditure in the development of the system, is reduced.

In a further embodiment, in the case of a discontinuous free range in which the individual portions are not suitable for accommodating a late injection for its total duration, a late injection is split up into a plurality of partial injections and arranged in different portions of the free range. In this way, it is possible to ensure reliable and complete metering-in of the fuel quantity assigned to the late injection, which increases the effectiveness of the method overall.

In a further embodiment of the subject matter, the late injection is arranged, as a function of further operating parameters of the internal combustion engine, at an early or middle or late time in relation to the crankshaft angle within the free range or the predetermined portion of the free range. This encompasses both the possibility of positioning the late injection at a suitable point within a continuous free range or portion of the free range, and also the possibility, in the case of a discontinuous free range, of distributing the late injection if appropriate between a plurality of successive portions in early, middle or late positions in the free range. This has the advantage that the effect of the late injection on the respective operating state of the internal combustion engine and of the exhaust-gas aftertreatment system can be optimized. Corresponding operating parameters are for example the rotational speed of the internal combustion engine, the temperatures of the internal combustion engine and of the exhaust-gas aftertreatment system, the available working pressure in the pressure accumulator of the injection system, or the demanded torque.

A device for operating an internal combustion engine having a plurality of cylinders to which is assigned in each case one injection valve for metering in fuel has a control device having at least one output stage. The respective output stage is provided for actuating the injection valves of a plurality of cylinders thereby combined to form an output stage group. The cylinders each run through working cycles temporally offset one after the other in an ignition sequence, wherein an injection cycle is run through in each working cycle of a respective cylinder, said injection cycle comprising working injections and at least one late injection.

The control device is designed and set up such that, in succession, the working injections (P0 to P4) are determined, with duration and positioning in relation to the crankshaft rotational angle, for a current cylinder (CYL_i) of the output stage group in the ignition sequence. Subsequently, a setpoint crankshaft angle range within which the late injection of a preceding cylinder (CYL_i−1) in the ignition sequence should be arranged is determined. Furthermore, a free range within the setpoint crankshaft angle range, during which free range no injection takes place and the output stage is available for generating a late injection, is determined taking into consideration the determined working injections (P0 to P4) of the current cylinder (CYL_i) in the ignition sequence. Subsequently, the at least one late injection (P5) assigned to the preceding cylinder (CYL_i−1) in the ignition sequence is defined, and arranged within the determined free range (FB) of the current cylinder, with regard to the parameters which determine the injection quantity. The output stage is actuated so as to act on the respective injection valves with actuating signals for generating the working injections (P0 to P4) and the late injection (P5).

An internal combustion engine (FIG. 1) comprises an intake tract 1, an engine block 2, a cylinder head 3 and an exhaust tract 4. The intake tract 1 preferably comprises a throttle flap 5, an accumulator 6 and a suction pipe 7 which leads to a cylinder Z1 via an inlet duct into the engine block. The engine block 2 also comprises a crankshaft 8 which is coupled via a connecting rod 10 to the piston 11 of the cylinder Z1.

The cylinder head 3 comprises a valve train having a gas inlet valve 12 and a gas outlet valve 13.

The cylinder head 3 also comprises an injection valve 18 and an ignition actuator 19. The ignition actuator 19 may be designed for example as a transistor coil ignition means with corresponding ignition electrode, as a high-voltage capacitor ignition means, as an alternating-current voltage ignition means, as a laser ignition means or as a further type of ignition actuator known to a relevant person skilled in the art. In the case of an auto-ignition combustion process, such as for example in the case of a diesel engine, the ignition actuator 19 may basically also be omitted.

In the exhaust tract 4 there is arranged a catalytic converter designed preferably as a three-way catalytic converter. Also preferably arranged in the exhaust tract is a further catalytic converter 23 designed as a NOX catalytic converter. In addition or alternatively there may be also be provided a particle filter, in particular a diesel particle filter.

A control device 25 is provided, to which sensors are assigned which detect different measurement variables and determine in each case the value of the measurement variable. Operating variables comprise not only the measurement variables but also variables derived therefrom. The control device 25 is designed to determine, as a function of at least one of the operating variables, actuating variables which are then converted into one or more actuating signals for controlling actuating elements assigned to the control device 25.

The control device 25 comprises inter alia a memory designed to store data and program commands, and a processing unit designed to execute program commands. The memory and the processing unit preferably form at least a part of a computer encompassed by the control device 25.

Sensors are a pedal position transducer 26 which detects an accelerator pedal position of an accelerator pedal 27, an air mass sensor 28 which detects an air mass flow upstream of the throttle flap 5, a first temperature sensor 32 which detects an intake air temperature, a suction pipe pressure sensor 34 which detects a suction pipe pressure in the collector 6, a crankshaft angle sensor 36 which detects a crankshaft angle to which is then assigned a rotational speed N. Also provided is a second temperature sensor 38 which detects an operating temperature, in particular a coolant temperature or a fuel temperature. Also provided is a pressure sensor 39 which detects a fuel pressure PFU, in particular in a high-pressure fuel supply. Also provided is an exhaust-gas probe 42 which is arranged upstream of or in the catalytic converter 21 and which detects a residual oxygen content of the exhaust gas and the measurement signal of which is characteristic of the air/fuel ratio in the combustion chamber of the cylinder Z1 and upstream of the first exhaust-gas probe before the oxidation of the fuel, this being referred to hereinafter as the air/fuel ratio in the cylinders Z1 to Z4. Depending on the embodiment, any desired subset of the stated sensors may be provided, or additional sensors may also be provided.

The actuators are for example the throttle flap 5, the gas inlet and gas outlet valves 12, 13, the injection valve 18 or the spark plug 19.

Aside from the cylinder Z1 there are also provided further cylinders Z2 to Z4, to which corresponding actuating elements and, if appropriate, sensors are also assigned. The internal combustion engine may therefore have any desired number of cylinders.

The control device 25 comprises a processing unit in which the programs are preferably executed during the operation of the internal combustion engine. The control device 25 also comprises at least one output stage 25a provided for actuating a plurality of injection valves 18 which are assigned to an output stage group and which are assigned to different cylinders Z1, Z2, Z3 and Z4. It is thus possible, for example, for a single output stage 25a to be assigned to all the cylinders Z1 to Z4, or else for a number of cylinders to be combined in an output stage group and for said number to be assigned in each case one separate output stage.

In the case of an injection valve 18 having a piezoelectric actuator, the output stage is designed for example to generate an actuating signal for the respective piezoelectric actuator, which actuating signal comprises a charging and a subsequent discharging again of the piezoelectric actuator in order to realize a respective injection impulse. Here, the output stage is designed such that it can generate an actuating signal simultaneously only for a single actuator of an injection valve.

The output stage 25a and also the injection valves 18 are preferably designed such that a plurality of partial injections can be triggered per injection valve 18 during a working cycle or an injection cycle. It is thus possible, for example, for five or six partial injections to be carried out during one working cycle.

Figure 2:
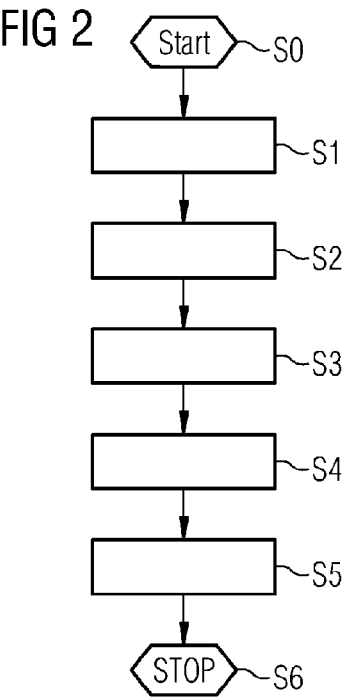
FIG. 2 shows a flow diagram of a program executed in the control device.

A program for operating the internal combustion engine is started in a step S0 (FIG. 2) in which, if appropriate, variables and parameters can be initialized. With regard to the steps of the program, reference is also additionally made to FIGS. 3 and 4.

In a step S1, for a current cylinder CYL_i of an output stage group in the ignition sequence, the working injections P0, P1, P2, P3, P4 are determined which, on the basis of actuation parameters, are completed in any case before the start of the earliest possible working injection of the subsequent cylinder CYL_i+1 of the same output stage group in the ignition sequence.

A further, later injection into cylinder CYL_i is graded as late injection P5. In a step S2, for the late injection P5 assigned to the preceding cylinder CYL_i-1 of the same output stage group in the ignition sequence, the injection valve 18 of which is thus actuated by means of the same output stage 25a, a predefined setpoint crankshaft angle range SB is determined within which the late injection P5 should take place. The setpoint crankshaft angle range SB starts at a start angle SOI_LIM and ends at an end angle EOI_LIM. The start angle SOI_LIM and/or the end angle EOI_LIM are determined as a function of at least one load value such as for example the rotational speed N and/or a torque, in particular an indicated torque TQI, specifically preferably as a function of a respective characteristic map.

The late injection P5 is in particular an injection metered in for example for the purpose of a filter regeneration, without being oxidized (ignited) within the combustion chamber of the respective cylinder (Z1 to Z4). This is typically possible in a relatively broad angle range. Accordingly, the setpoint crankshaft angle range SB for the late injection P5 is typically a relatively broad angle range and can therefore be correspondingly calibrated in a predefined range determined in particular taking into consideration an opening and closing of the gas exchange valves, that is to say of the inlet and outlet valves 12, 13.

In the case of a typical arrangement of 4 cylinders (Z1 to Z4) in an output stage group, the start angle SOI_LIM of the setpoint crankshaft angle range SB for the late injection P5 lies for example at least 120° after ignition top dead center TDC of the associated reciprocating piston 11 of the respective cylinder.

In a step S3, it is determined which range of the setpoint crankshaft angle range SB remains free taking into consideration the working injections P0 to P4 of the current cylinder CYL_i in the ignition sequence, specifically as a free range between the individual working injections P0 to P4 of the cylinder CYL_i. Depending on the position of the individual working injections P0 to P4, the free range FB may be continuous, as illustrated in FIG. 3, or else may be split up into different portions, as illustrated in FIG. 4.

In determining the free range FB, it is also necessary to take into consideration working injections P0 to P4 which are situated only partially in the setpoint crankshaft angle range SB.

Furthermore, it must be taken into consideration that a predefined minimum interval between two injections controlled by the same output stage must be adhered to, both in the same cylinder and also in different cylinders.

In a step S4, the late injection P5 is targetedly arranged within the free range FB. Here, the relevant late injection P5 may be arranged in the respective free range FB or in the corresponding part of the free range FB in a centered, left-aligned or right-aligned configuration.

In the case of a discontinuous free range FB, as shown for example in FIG. 4, the late injection P5 is preferably provided in a middle portion of the free range FB.

In the special situation in which the late injection P5, owing to its duration, cannot be accommodated for its total duration in a single range part of the free range FB, the late injection P5 may for example also be split up into a plurality of partial injections and distributed between a plurality of range parts of the free range FB.

In a step S5, the output stage 25a is actuated so as to act on the respective injection valve 18 with actuating signals for generating the working injections P0 to P4 of the current cylinder CYL_i and the late injection P5 of the preceding cylinder CYL_i−1 of the same output stage group. The actuation of the output stage carried out in step S5 may self-evidently also take place in parallel with the execution of other steps S1 to S4 and S6 for the other cylinders.

In a step S6, the program finally comes to an end. The program is preferably re-started for example on an event-controlled basis or cyclically and may for example be re-started in each case with cylinder segment synchronicity. Here, a cylinder segment is defined by the duration of a working cycle in terms of crankshaft angle divided by the number of cylinders belonging to the same output stage group.

What is claimed is:

1. A method for operating an internal combustion engine having a plurality of cylinders to which is assigned in each case one injection valve for metering in fuel, wherein a control device is provided having in each case one output stage for actuating the injection valves of a plurality of cylinders thereby combined to form an output stage group, and wherein the cylinders each run through working cycles temporally offset one after the other in an ignition sequence, and an injection cycle is run through in each working cycle of a respective cylinder, said injection cycle comprising working injections and, if required in an operating mode, at least one late injection, the method comprising the following steps:
   determining the working injections, with duration and positioning in relation to the crankshaft rotational angle, for a current cylinder of the output stage group in the ignition sequence,
   determining a setpoint crankshaft angle range within which the late injection of a preceding cylinder in the ignition sequence should be arranged, the predefined setpoint crankshaft angle range being determined as a function of at least one of the rotational speed of the crankshaft and a torque of the internal combustion engine,
   determining a free range within the setpoint crankshaft angle range, taking into consideration the determined working injections of the current cylinder in the ignition sequence, during which no injection takes place and (b) a predefined non-zero minimum duration between consecutive injections in different cylinders,
   defining the late injection assigned to the preceding cylinder in the ignition sequence and arranging said late injection within the determined free range of the current cylinder, and
   actuating the output stage to act on the respective injection valves with actuating signals for generating the working injections and the late injection.

2. The method according to claim 1, wherein a start angle of the setpoint crankshaft angle range lies at least 120° after ignition top dead center TDC of a reciprocating piston of the respective cylinder.

3. The method according to claim 1, wherein, in the case of a free range composed of a plurality of discontinuous range pans, the late injection is arranged in a range part of the free range which, owing to its temporal extent, is suitable for accommodating the late injection for its total duration.

4. The method according to claim 1, wherein, in the case of a free range composed of a plurality of discontinuous range parts, the late injection is spilt up into a plurality of partial injections and arranged so as to be distributed between different range parts of the free range.

5. The method according to claim 1, wherein the late injection is arranged at a middle time in relation to the crankshaft angle within the free range or the predetermined portion of the free range.

6. The method according to claim 1, wherein the late injection is arranged, as a function of further operating parameters, at an early or middle or late time in relation to the crankshaft angle within the free range or the predetermined portion of the free range.

7. A device for operating an internal combustion engine having a plurality of cylinders to which is assigned in each case one injection valve for metering in fuel, wherein the device has a control device having an output stage for actuating the injection valves of a plurality of cylinders thereby combined to form an output stage group, and wherein the cylinders each run through working cycles temporally offset one after the other in an ignition sequence, and an injection cycle is run through in each working cycle of a respective cylinder, said injection cycle comprising working injections and, if required in an operating mode, at least one late injection, wherein the control device is designed and set up such that
   the working injections are determined, with duration and positioning in relation to the crankshaft rotational angle, for a current cylinder of the output stage group in the ignition sequence,
   a setpoint crankshaft angle range within which the late injection of a preceding cylinder in the ignition sequence should be arranged is determined, the predefined setpoint crankshaft angle range being determined as a function of at least one of the rotational speed of the crankshaft and a torque of the internal combustion engine,
   a free range within the setpoint crankshaft angle range, during which free range no injection takes place and the output stage is available for generating a late injection, is determined taking into consideration the determined working injections of the current cylinder in the ignition sequence and (b) a predefined non-zero minimum duration between consecutive injections in different cylinders,
   the late injection assigned to the preceding cylinder in the ignition sequence is defined and arranged within the determined free range of the current cylinder, and
   the output stage is actuated to act on the respective injection valves with actuating signals for generating the working injections and the late injection.

8. The device according to claim 7, wherein a start angle of the setpoint crankshaft angle range lies at least 120° after ignition top dead center TDC of a reciprocating piston of the respective cylinder.

9. The device according to claim 7, wherein, in the case of a free range composed of a plurality of discontinuous range parts, the late injection is arranged in a range part of the free range which, owing to its temporal extent, is suitable for accommodating the late injection for its total duration.

10. The device according to claim 7, wherein, in the case of a free range composed of a plurality of discontinuous range parts, the late injection is split up into a plurality of partial injections and arranged so as to be distributed between different range parts of the free range.

11. The device according to claim 7, wherein the late injection is arranged at a middle time in relation to the crankshaft angle within the free range or the predetermined portion of the free range.

12. The device according to claim 7, wherein the late injection is arranged, as a function of further operating parameters, at an early or middle or late time in relation to the crankshaft angle within the free range or the predetermined portion of the free range.

\* \* \* \* \*